(12) United States Patent  (10) Patent No.: US 8,416,937 B2
Bentley et al.  (45) Date of Patent: Apr. 9, 2013

(54) SYSTEM AND METHOD FOR CHANGING CONFERENCE MODERATORS DURING A CONFERENCE CALL

(75) Inventors: Jon L. Bentley, New Providence, NJ (US); Anjur S. Krishnakumar, Princeton, NJ (US); Parameshwaran Krishnan, Basking Ridge, NJ (US); Navjot Singh, Denville, NJ (US); Shalini Yajnik, Berkeley Heights, NJ (US)

(73) Assignee: Avaya Inc., Basking Ridge, NJ (US)

( * ) Notice: Subject to any disclaimer, the term of this patent is extended or adjusted under 35 U.S.C. 154(b) by 176 days.

(21) Appl. No.: 12/978,742

(22) Filed: Dec. 27, 2010

(65) Prior Publication Data

US 2012/0163576 A1 Jun. 28, 2012

(51) Int. Cl.
 *H04M 3/42* (2006.01)
(52) U.S. Cl.
 USPC ............ 379/203.01; 709/204; 370/260
(58) Field of Classification Search ............ 379/202.01, 379/203.01, 204.01; 370/260; 709/204
 See application file for complete search history.

(56) References Cited

U.S. PATENT DOCUMENTS

| 7,715,541 B2* | 5/2010 | Arrant et al. ............. 379/202.01 |
| 7,783,022 B1* | 8/2010 | Jay et al. .................. 379/202.01 |
| 2003/0103468 A1* | 6/2003 | Seavers et al. ................ 370/260 |
| 2008/0005244 A1 | 1/2008 | Vernon et al. |
| 2009/0094533 A1* | 4/2009 | Bozionek et al. ............. 715/753 |
| 2009/0220063 A1* | 9/2009 | Miller et al. ............. 379/202.01 |
| 2010/0064010 A1* | 3/2010 | Alkov et al. .................. 709/206 |
| 2011/0314397 A1* | 12/2011 | Ogle et al. .................... 715/764 |
| 2012/0063360 A1* | 3/2012 | Muramoto et al. ........... 370/254 |
| 2012/0163576 A1* | 6/2012 | Bentley et al. ........... 379/202.01 |

* cited by examiner

*Primary Examiner* — Creighton Smith

(57) ABSTRACT

Disclosed herein are systems, methods, and non-transitory computer-readable storage media for changing moderators during a e-conference. To change moderators during an e-conference, a system identifies a departure of the original moderator from the e-conference. A moderator can indicate his intention to leave an e-conference through the conferencing system. A participant to replace the original moderator is identified and subsequently promoted to replacement moderator while maintaining the e-conference. Additionally, changing moderators during an e-conference is accomplished by creating a new conference bridge and transferring each participant to the new conference bridge. This method allows for a seamless transfer between moderators during an e-conference without the inconvenience of reconnecting.

23 Claims, 4 Drawing Sheets

SYSTEM AND METHOD FOR CHANGING CONFERENCE MODERATORS DURING A CONFERENCE CALL

BACKGROUND

1. Technical Field

The present disclosure relates to conferences and more specifically to changing conference moderators during an e-conference.

2. Introduction

In the business world, it is often necessary to conduct meetings with people at other physical locations, including those within the same company and those from different companies. E-conferencing is one method for a group of people to communicate with each other without physically being in the same location. An e-conference is an electronic conference that allows for one or more participants to conference over a telephone or other type of connection instead of requiring the participants to physically travel to the conference location. E-conferences can significantly reduce the costs of meeting since participants do not need to travel to the conference location. Many businesses and organizations utilize e-conferencing to accomplish their objectives more economically.

To schedule an e-conference, participants can send their availability to all other participants and a mutually agreed upon time and date for the e-conference to occur is established by the participants. Optionally, an e-conference participant or scheduler schedules the e-conference based on availability as indicated in a digital calendaring system. Typically, a participant is supplied a phone number and a code that allows them to access the e-conference. At the scheduled time, participants connect to the e-conference.

During an e-conference, a moderator typically leads the group discussion. Utilizing a moderator may be necessary in some systems for the group to accomplish their goals for the meeting. The moderator leads the discussion and the participants speak up at an appropriate time. Once the group accomplishes its objectives for the e-conference, the moderator ends the call. E-conferences are usually identified with a host and participant code, with the moderating entering the conference using a host code.

Oftentimes during the duration of an e-conference, it is necessary to change moderators for a variety of reasons. A moderator may need to attend another meeting, a moderator may not be interested in the discussion or a moderator may need to depart from a call temporarily. Traditionally, an e-conference must terminate in order to change moderators. Each participant in the e-conference must disconnect and then reconnect with a new moderator in place. This process is inefficient, cumbersome and time consuming.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for changing moderators during an e-conference. To change moderators during an e-conference, a system identifies a departure of the moderator from the e-conference, an impending departure from the e-conference, or a scheduled departure from the e-conference. The system identifies a participant in the e-conference to replace the original moderator, and promotes the participant to moderator to replace the original moderator. The original moderator can signal his intention to leave a conference via one or more of a button press, natural language input, gesture, keyword, phrase, password, or other user input. Once the new moderator is established, the participants of the e-conference may be transferred from the first moderator's bridge to the second moderator's bridge without disconnecting the participants from the conference.

The process of selecting a new moderator to take the place of the original moderator is also discussed. The system can select a new moderator in a number of ways. The new moderator can be selected from a subset of conference participants, either randomly or deterministically. The new moderator can be selected based on how efficiently the transfer of participants to the second moderator's bridge can occur, if such a transfer is needed. The new moderator can be selected based on a majority vote by the e-conference participants. Optionally, the new moderator can be selected based on proximity to the original moderator in a hierarchy, such as a business structure. Additionally, determining a temporary moderator while the first moderator disconnects and then reconnects to the e-conference is discussed.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for changing moderators during an e-conference. A system, method and non-transitory computer-readable media are disclosed which change moderators during an e-conference. E-conferences can include any form of multi-party electronic communications, such as telephone conference calls, video conferences, text-based online chat rooms, three-dimensional and/or virtual reality based conferences, and so forth. A brief introductory description of a basic general purpose system or computing device in FIG. 1 which can be employed to practice the concepts is disclosed herein. A more detailed description of exemplary variations for changing moderators in an e-conference will then follow. The disclosure now turns to FIG. 1.

Figure 1:
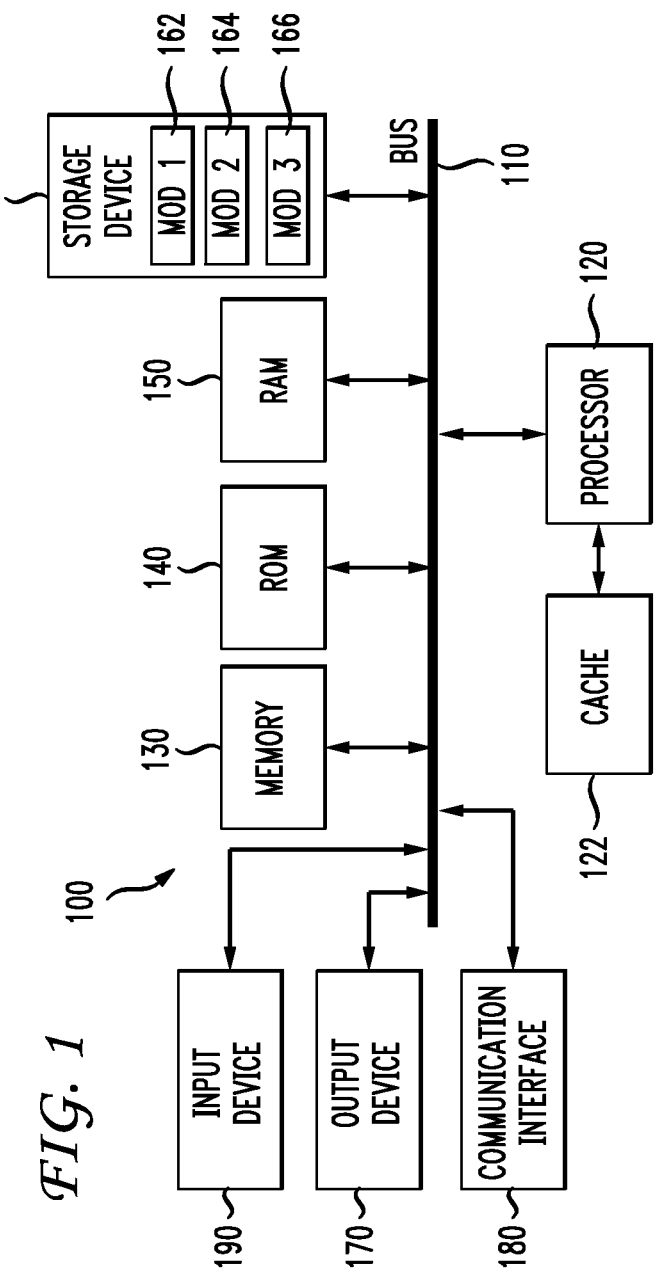
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache of high speed memory connected directly with, in close proximity to, or integrated as part of the processor 120. The system 100 copies data from the memory 130 and/or the storage device 160 to the cache for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
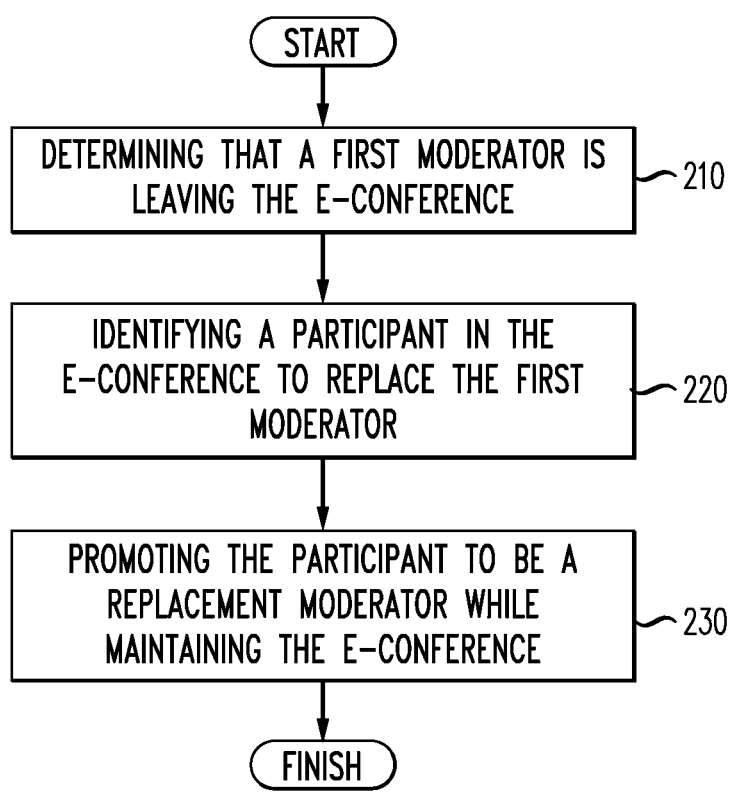
FIG. 2 illustrates an example moderator change method embodiment.

Having disclosed some basic system components and concepts, the disclosure now turns to the exemplary method embodiment shown in FIG. 2. For the sake of clarity, the method is discussed in terms of an exemplary system 100 as shown in FIG. 1 configured to practice the method. The steps outlined herein are exemplary and can be implemented in any combination thereof, including combinations that exclude, add, or modify certain steps.

FIG. 2 illustrates changing moderators during an e-conference. The system first identifies a departure of a moderator from the e-conference 210. A moderator indicates his intention to leave the e-conference via a button press, natural language input, gesture, keyword, phrase, and/or password. Once the system determines that a moderator is leaving (in the case of a planned departure) or has left (in the case of an unexpected departure) the e-conference, the system 100 identifies a participant in the e-conference to replace the first moderator 220. After the system 100 identifies a participant to replace the original moderator, the system promotes the participant to the replacement moderator 230. The process of promoting the participant to replacement moderator is accomplished while maintaining the e-conference. Traditionally, changing moderators during an e-conference required the participants to disconnect and then reconnect with a new moderator in place.

Figure 3:
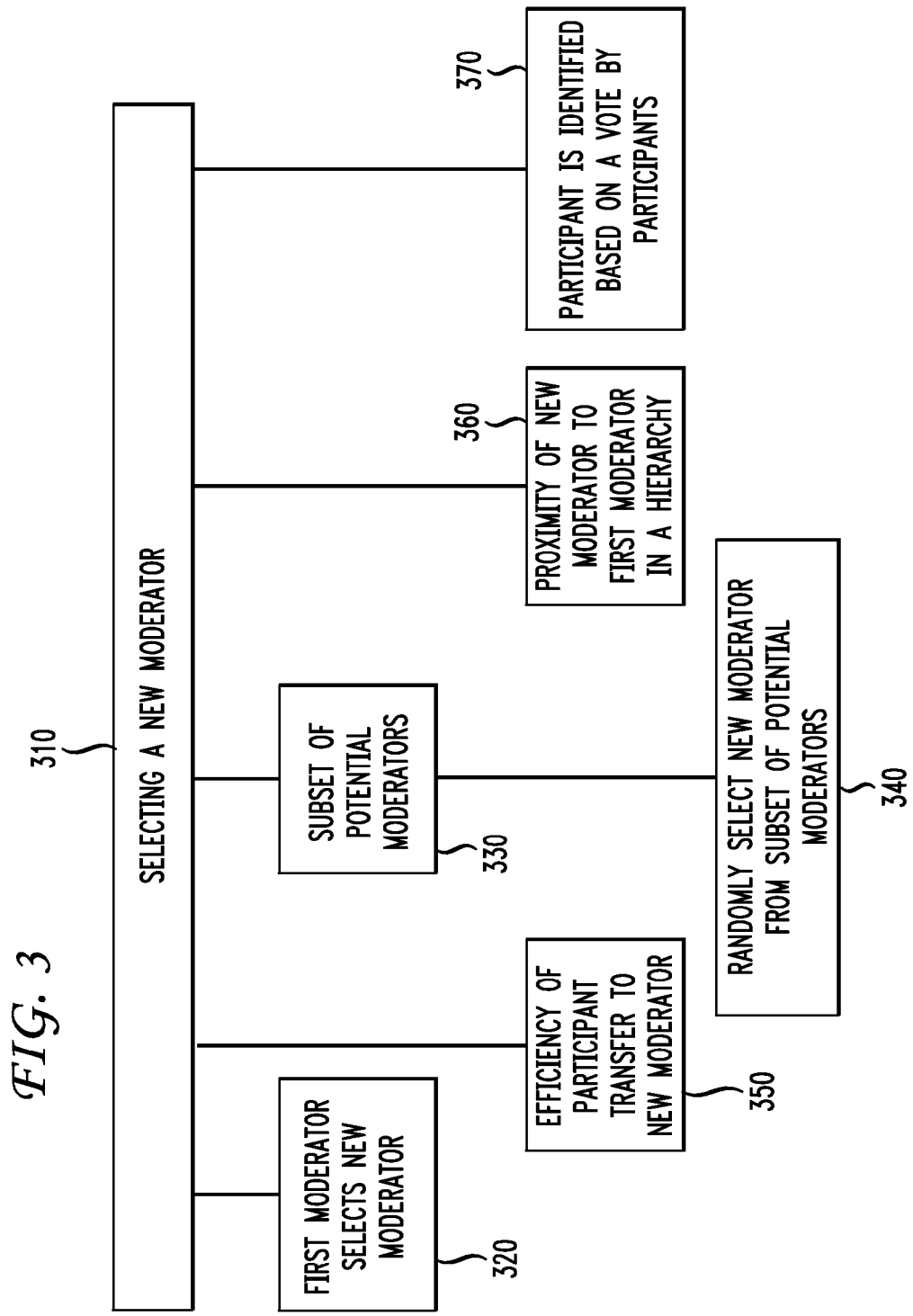
FIG. 3 illustrates selecting a new moderator.

FIG. 3 illustrates selecting a new moderator to replace the original moderator in an e-conference 310. The system 100 selects a replacement moderator in numerous ways. Before the original moderator leaves the e-conference, the original moderator selects the participant to promote to replacement moderator 320. If Alice is the original moderator, before she leaves the e-conference she can select Bob as the replacement moderator. The system 100 can create a subset of potential moderators, either performed by humans or automatically, and select the replacement moderator from the subset of potential moderators 330. The subset of potential moderators is selected by the original moderator or by the system based on guidelines such as having moderated previously or has attended a certain number of e-conferences. Alternatively, participants with authority may select the subset of potential moderators. Once a subset of potential moderators is established, the system can randomly select the replacement moderator from a subset of potential moderators 340. Additionally, the replacement moderator can be selected deterministically from the subset of potential moderators.

Another way to select the replacement moderator is based on the efficiency of participant transfer to the new moderator from the original moderator. For example, it may be more efficient to transfer participants from the original moderator to the replacement moderator in the same building, in the same city, on the same telephony switch, or on the same brand of telephony switch as the original moderator, for example. Alternatively, the system selects the replacement moderator based on the efficiency of transferring participants for billing the e-conference or where the bridge is in the network. In this way the replacement moderator is selected based on the efficiency of participant transfer.

Figure 4:
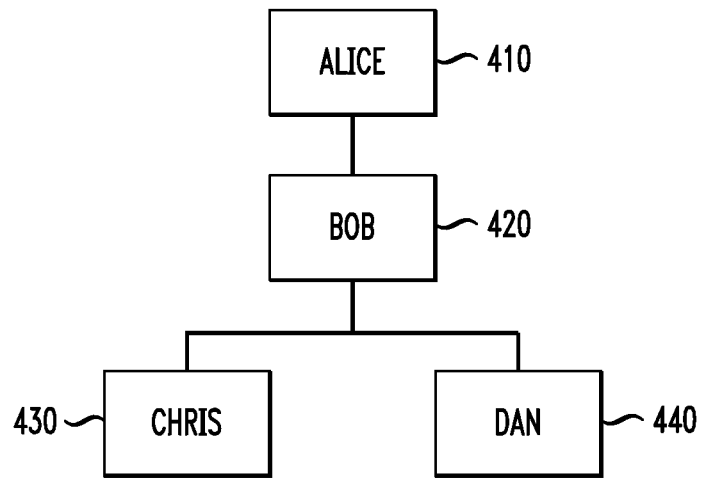
FIG. 4 illustrates a business hierarchy.

The system can select the replacement moderator based on the proximity of the new moderator to the original moderator in a hierarchy, for example a business hierarchy. FIG. 4 illustrates a business hierarchy. In the business hierarchy example, when the moderator is the chief executive officer Alice 410, the replacement moderator is the vice president Bob 420. When the moderator is the vice president Bob 420, the replacement moderator could be selected from a subset of potential moderators, department heads Chris 430 and Dan 440 who are the next in line in the business hierarchy. From the subset of potential moderators, the replacement moderator is chosen randomly or based on some qualification such as having more experience or conducted more e-conferences. The system can prompt the next person in the hierarchy if they wish to assume the moderatorship. If the next person in the hierarchy declines, he or she can designate which participant is to be the replacement moderator.

The system can select the replacement moderator based on a vote by participants in an e-conference. When a moderator indicates his intention to leave the e-conference, he can conduct a vote to determine the replacement moderator. Alternatively, the participants can vote on the moderator line of succession prior to the start of the e-conference so as to not interrupt the e-conference to determine the replacement moderator if necessary.

Another way to select the replacement moderator is based on a backup moderator. Before the e-conference begins or at any other time, the moderator can designate a backup moderator to take over moderating the conference when the original moderator leaves, either expectedly or unexpectedly. The moderator and/or the system can notify the backup moderator that he has been designated as the backup moderator and can request a confirmation or agreement to serve in that capacity. Specifying a backup moderator provides a fallback in case the system does not select a new moderator during the e-conference.

The system can analyze the content, style, or other characteristics of the speech, video stream, or other communication information to determine which participant is the closest to the outgoing moderator. For example, if one of the participants uses the same type of terminology and is calling in from the same telephone switchboard as the current moderator, the system can identify that participant as a potential replacement moderator. In one aspect, the system considers multiple hierarchies from different organizations when selecting a new moderator. For example, consider the example of the e-conference including a first manager and a first group of workers from company X and a second manager and a second group of workers from company Y, and the first manager is the moderator. If the first manager drops off the call, a single company hierarchy analysis would likely promote a worker from the first group of workers. However, if the system is able to analyze hierarchies spanning company X and company Y, then the system can determine that the second manager, for example, is a more natural replacement moderator for the first manager.

Figure 5:
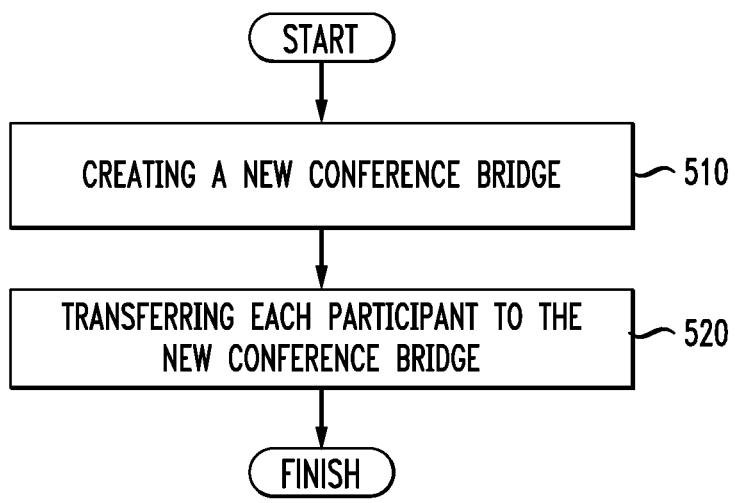
FIG. 5 illustrates an example moderator change method embodiment.

FIG. 5 illustrates automatically transferring participants of an e-conference from the original moderator to the replacement moderator. The system creates a new conference bridge for the replacement moderator 510 and transfers each participant to the new conference bridge 520 without disconnecting the participants from the e-conference. Once the transfer occurs, the replacement moderator moderates the e-conference. The advantage of having the system automatically transfer participants is that they do not all need to disconnect from the call and reconnect. The automatic transfer of participants is a more efficient method to change moderators during an e-conference. Alternatively, a new conference moderator can continue to use the same conference bridge as the original moderator. For example, when multiple participants in an e-conference are physically located in the same room, the original moderator can choose a replacement moderator from those participants in the same room. In this case, the system can simply change the billing for the e-conference from the original moderator to the replacement moderator.

The automatic transfer of participants between moderators is beneficial when a moderator needs to leave an e-conference temporarily or unexpectedly. When a moderator must leave an e-conference temporarily, he can indicate to the participants that he will leave but later return and the system can select a replacement moderator temporarily. Once the original moderator returns, the system reverts moderatorship to the original moderator from the temporary replacement moderator. For example, Alice must leave an e-conference for ten minutes so she names Chris as the temporary replacement moderator. When Alice returns, the system automatically transfers the participants back to the conference bridge associated with Alice. When the replacement moderator's conference bridge is the same as the original moderator's bridge, participants are not transferred to a new bridge.

When a moderator leaves an e-conference unexpectedly, for example the moderator is disconnected from the call, the system can automatically create a new e-conference bridge and transfer each participant to the new conference bridge with a new moderator, or select and promote one of the existing participants to moderator, leaving the line open without a transfer to a new bridge. Additionally, when a moderator leaves an e-conference temporarily or unexpectedly, the system can change the billing information associated with the moderator and leave the bridge intact, or change other parameters associated with the bridge. These methods allow an e-conference to continue when the moderator unexpectedly leaves the call. Allowing a call to continue is beneficial to all participants in the e-conference in that it saves time and resources since participants do not need to reconnect to the e-conference.

Additionally, the automatic transfer of participants between moderators is beneficial when a participant joins the call late. The participant connects in the usual manner (e.g., by calling the conference bridge and entering the participant code) but is automatically redirected to the new moderator's conference bridge. The system can use an interactive voice response system to determine which conference the new participant wants to join. An interactive voice response system allows a human to interact with a computer by using keypad input or voice recognition technology. By automatically transferring the participant, the participant does not need to receive updated moderator information and does not need a new phone number and code to input when connecting to the e-conference. The transfer of participants to a bridge of the new moderator is a seamless process that does not disrupt the e-conference. If participants join the conference late, such as after a moderator change that triggered a new bridge, the system can automatically and transparently forward any late callers who dial the old bridge to the new bridge with the replacement moderator.

Alternatively, the moderator may choose to not select a replacement moderator or may not have sufficient time and/or notice to select a replacement moderator. In this case, the system can leave the e-conference open for a specified duration of time after the moderator leaves the call. For example, the moderator leaves the call open for ten minutes after all of the agenda items have been discussed to allow the participants to ask questions of each other. The moderator can still facilitate the e-conference but does not need to physically be on the line. The moderator can specify that an e-conference is drop-protected so that the e-conference is not automatically terminated when the moderator leaves. The moderator may specify how a replacement moderator is selected on unscheduled drops.

E-conferences can include telephone calls, Voice over IP calls, video conferences, and other continuous communications involving multiple parties. For example, the principles disclosed herein are applicable to a Skype™ style video call with a video conference moderator.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method of changing moderators during an e-conference, the method comprising:
 identifying a departure of a first moderator from the e-conference;
 identifying, based on a selection by the first moderator, a participant in the e-conference to replace the first moderator; and promoting the participant to be a replacement moderator while maintaining the e-conference and connections to remaining participants in the e-conference.

2. The method of claim 1, wherein the departure is identified based on an indication that the first moderator will leave the e-conference, the first moderator providing the indication electronically via at least one of a text-based message, button press, natural language input, gesture, keyword, phrase, and password.

3. The method of claim 1, wherein the participant is identified from a subset of e-conference participants.

4. The method of claim 3, wherein the participant is identified randomly from the subset of e-conference participants.

5. The method of claim 1, wherein the participant is identified based on a projected efficiency of transfer of participants to the replacement moderator.

6. The method of claim 1, wherein the participant is identified based on proximity to the first moderator in a hierarchy.

7. The method of claim 1, wherein the participant is identified based on a vote by participants in the e-conference.

8. The method of claim 1, further comprising establishing a temporary moderator while the first moderator disconnects and reconnects to the e-conference.

9. The method of claim 1, further comprising automatically transferring participants of the e-conference to a conference bridge associated with the replacement moderator.

10. The method of claim 9, further comprising:
creating a new conference bridge; and
transferring each participant to the new conference bridge.

11. The method of claim 9, further comprising automatically redirecting participants who join the e-conference after the creation of the new conference bridge to the new conference bridge.

12. A system for changing conference moderators during a e-conference, the system comprising:
a processor;
a first module configured to control the processor to identify a departure of a first moderator from the e-conference;
a second module configured to control the processor to identify, based on a selection by the first moderator, a participant in the e-conference to replace the first moderator; and
a third module configured to control the processor to promote the participant to be a replacement moderator while maintaining the e-conference and connections to remaining participants in the e-conference.

13. The system of claim 12, wherein the departure is identified based on an indication that the first moderator will leave the e-conference, the first moderator providing the indication electronically via at least one of a text-based message, button press, natural language input, gesture, keyword, phrase, and password.

14. The system of claim 12, wherein identifying the participant in the e-conference to replace the first moderator is based on a selection by the first moderator.

15. The system of claim 12, wherein the participant is identified from a subset of e-conference participants.

16. A non-transitory computer-readable storage medium storing instructions which, when executed by a computing device, cause the computing device to change conference moderators during a e-conference, the instructions comprising:
identifying a departure of a first moderator from the e-conference;
identifying, based on a selection by the first moderator, a participant in the e-conference to replace the first moderator;
promoting the participant to be a replacement moderator while maintaining the e-conference and connections to remaining participants in the e-conference; and
automatically transferring participants of the e-conference to a conference bridge associated with the replacement moderator.

17. The non-transitory computer-readable storage medium of claim 16, further comprising:
creating a new conference bridge; and
transferring each participant to the new conference bridge.

18. The system of claim 15, wherein the participant is identified randomly from the subset of e-conference participants.

19. The system of claim 14, wherein the participant is identified based on a projected efficiency of transfer of participants to the replacement moderator.

20. The system of claim 14, wherein the participant is identified based on proximity to the first moderator in a hierarchy.

21. The system of claim 14, wherein the participant is identified based on a vote by participants in the e-conference.

22. The system of claim 12, further comprising a fourth module configured to control the processor to automatically transfer participants of the e-conference to a conference bridge associated with the replacement moderator.

23. The system of claim 12, further comprising a fourth module configured to control the processor to leave the e-conference open for a period of time upon determining that the first moderator has left the e-conference.

* * * * *